United States Patent
Moore et al.

(10) Patent No.: US 7,335,349 B2
(45) Date of Patent: Feb. 26, 2008

(54) FISH ATTRACTANTS

(75) Inventors: Andrew Moore, Barnby (GB); Nicola Jane Lower, Halesworth (GB)

(73) Assignee: The Minister of Agriculture Fisheries and Food, London (GB)

( * ) Notice: Subject to any disclaimer, the term of this patent is extended or adjusted under 35 U.S.C. 154(b) by 339 days.

(21) Appl. No.: 10/343,317

(22) PCT Filed: Jul. 27, 2001

(86) PCT No.: PCT/GB01/03351

§ 371 (c)(1),
(2), (4) Date: May 23, 2003

(87) PCT Pub. No.: WO02/09523

PCT Pub. Date: Feb. 7, 2002

(65) Prior Publication Data

US 2004/0029276 A1   Feb. 12, 2004

(30) Foreign Application Priority Data

Jul. 27, 2000  (GB) ................................ 0018390.5

(51) Int. Cl.
*A01N 25/02* (2006.01)
(52) U.S. Cl. ........................ 424/84; 514/171; 514/172; 514/574
(58) Field of Classification Search ................ 514/171, 514/172, 574; 424/84
See application file for complete search history.

(56) References Cited

FOREIGN PATENT DOCUMENTS

WO    99/16315    4/1999

OTHER PUBLICATIONS

Resink, et al.: "The Chemical Nature of Sex Attracting Pheromones from the Seminal Vesicle of the African Catfish, Clarias Gariepinus", *Aquaculture*, vol. 83, pp. 137-151 (1989).

Waring, et al.: "Milt and endocrine responses of mature male atlantic salmon (*Salmo salar* L.) parr to water borne testosterone, 17,20 beta-dihydroxy-4-pregne-3-one 20-sulfate, and the urines from adult female and male salmon" *General and Comparative Endocrinology*, vol. 103, pp. 142-149 (1996).

Hardege, J. D.: "Nereidid polychaetes as model organisms for marine chemical ecology", *Hydrobiologia*, vol. 402, pp. 145-161 (1999).

Van den Hurk, et al.: "Male reproductive system as sex pheromone producer in teleost fish", *Journal of Experimental Zoology*, vol. 261, pp. 204-213 (1992).

Bartels-Hardere, et al.: "Sex pheromones in marine polychaetes V: a biologically active compound from the coelomic fluid of female Nereis (Neanthes) japonica (*Annelida polychaeta*)", *Journal of Experimental Marine Biology and Ecology*, vol. 20, pp. 275-284 (1996).

Dittman, et al.: Avoidance of a putative pheromone, 17 alpha, 20 beta-dihydroxy-4-pregen-3-one, by precociously mature chinook salmon (*Oncorynchus tshawytscha*), National Research Council of Canada, vol. 72, pp. 215-219 (1994).

Yambe, et al.: "A releaser pheromone that attracts males in the urine of mature female masu salmon", *Journal of Fish Biology*, vol. 55, pp. 158-171 (1999).

*Primary Examiner*—Neil S. Levy
(74) *Attorney, Agent, or Firm*—Drinker, Biddle & Reath LLP.

(57) ABSTRACT

The present invention provides a fish attracting composition. Previously fish sex hormones were considered only to have a role in sexual reproduction, however the present invention shows that these hormones can be used to induce feeding behaviour in fish. In particular a fish attracting composition is disclosed which contains at least one fish sex hormone which functions as a sex pheromone, however a synthetic nature similar version thereof may alternatively be used. In particular, a fish composition containing the composition 12,20β-dihydroxy-4-pregnen-3-one is shown, this for inducing feeding behaviour in carp.

18 Claims, No Drawings

FISH ATTRACTANTS

The present invention relates to compositions formulated to act as attractants for fish in order to facilitate their capture and additionally for use in more general aquaculture purposes. More specifically, a composition is provided, which induces feeding behaviour and feeding in fish, for application onto or into bait, lures or flies for use by anglers and commercial fishermen during fishing.

Angling and fishing are popular sports, and accordingly there is a wide range of bait, lures and flies on the market, aimed at providing participants in these sports with more success in catching fish.

A number of fish sex hormones and their metabolites are known to function as sex pheromones. These exhibit distinct and fundamental roles in controlling the reproductive physiology and behaviour of fish (see *Fish Chemoreception* 1992. Edited by T. J. Hara, Fish and Fisheries Series 6, Chapman & Hall, London and Glasgow). These hormones and their metabolites are known to be released into the aquatic environment and can be detected by other fish, even when present at very low concentrations.

It is an object of the present invention to provide a composition which acts as an attractant to fish and which also leads to feeding behaviour and feeding in fish.

According to the present invention, there is provided a composition, for attracting fish to feed which contains at least one sex hormone which acts as a sex pheromone wherein the hormone is derived from fish or marine polychaetes.

In one embodiment, the composition comprises at least one sex hormone derived from fish.

In an alternative embodiment, the composition comprises at least one sex hormone derived from marine polychaetes.

In yet another embodiment of the present invention, the composition comprises a mixture of the hormones derived from fish and marine polychaetes.

Further, the composition may comprise any suitable mimetic or nature similar version of said suitable sex pheromones, or their associated metabolites.

Essentially, any suitable sex pheromone is taken to include all free and conjugated steroids which have been found in fish.

In one embodiment the composition is, or is included in, a bait which is used to catch fish.

In an alternative embodiment the composition is included in fish feed to attract fish and induce feeding.

Preferably the sex hormone is selected from the group consisting of; 17,20β-dihydroxy-4-pregnen-3-one, progesterone, 17,20β,21-trihydroxy-4-pregnen-3-one, testosterone glucuronide, 5β-pregnen-3α,17β-diol-20-one-3α-glucuronide, 17α-hydroxy-4-pregnen-3-one-20 sulphate, ketone 5-methyl-3-heptanone, ketone 3,5-octadiene-2-one; and prostaglandin (A, B, D, E and F-series).

In an alternative embodiment of the present invention, the composition contains a sex pheromone derived from marine polychaetes.

Preferably this sex pheromone is ketone 5-methyl-3-heptanone or ketone 3,5-octadiene-2-one or a synthetic nature similar version thereof.

Alternatively the sex pheromone derived from the marine polychaetes contains a purine ring system, such as uric acid and inosine or a synthetic nature similar version thereof.

The present invention further provides a fish feed composition comprising a sex hormone derived from fish or marine polychaetes or a synthetic nature similar version thereof together with an acceptable carrier.

Preferably the carrier is an aliphatic alcohol or propylene glycol.

Preferably where the sex hormone is derived from fish, it is 17,20β-dihydroxy-4-pregnen-3-one (also referred to as 17α,20β-dihydroxy-4-pregnen-3-one) or one of its conjugates.

Preferably the composition comprises one other volatile steroid glucuronide and a prostaglandin.

Preferably the composition is a liquid.

The invention further provides for the use of the composition in the attraction and capture of fish, this being due to the composition inducing feeding behaviour in the fish.

In a further aspect, the present invention provides a method of attracting fish and inducing feeding by said fish, through the use of said composition.

A further aspect of the present invention provides the application of the present composition to bait (live or dead), lures, flies (dry or wet) all for use in angling or commercial fishing.

In one embodiment, the invention provides a composition consisting of at least one fish sex pheromone together with an acceptable carrier.

In an alternative embodiment, the invention provides a composition consisting of a synthetic fish sex pheromone with an acceptable carrier.

Preferably the carrier solubilises the composition.

Preferred carriers include aliphatic alcohols such as ethanol, monoethylene glycol and propylene glycol.

It is preferred that the pheromone used in the composition of the invention is the fish sex hormone 17,20β-dihydroxy-4-pregnen-3-one or one other volatile steroid glucuronide together with at least one compound chosen from the prostaglandins.

A particularly preferred composition comprises at least 17,20β-dihydroxy-4-pregnen-3-one and prostaglandin $F_{2\alpha}$.

A further preferred comprises said sex hormones together with any potent aroma chemical present in the urine of fish.

The composition of the invention can be used in various embodiments.

The present invention therefore discloses novel compositions which contain at least one sex hormone which acts as a sex pheromone which is derived from fish or marine polychaetes, and which present an unexpectedly good attractive effect on fish for the purpose of feeding. This effect is particularly seen in relation to the induction of feeding and feeding behaviour in carp.

Such compositions may further be applied on any kind of bait used by anglers and fishermen to attract many different types of fish.

Herein the term "sex pheromone" is taken to include all free and conjugated steroids, which have been found in fish and marine polychaetes. Examples are: 17,20β-dihydroxy-4-pregnen-3-one, progesterone, 17,20β,21-trihydroxy-4-pregnen-3-one, testosterone glucuronide, 5β-pregnen-3α, 17β-diol-20-one-3α-glucuronide and 17α-hydroxy-4-pregnen-3-one-20 sulphate ketone 3,5-octadiene-2-one, ketone 5-methyl-3-heptanone; and prostaglandins (A, B, D, E and F-series) and their metabolites.

In one embodiment the composition of the present invention is a liquid in which bait, lure, fly, ground bait and/or hooks can be dipped into.

Alternatively, the liquid can be applied onto the bait, lure, fly, ground bait and/or hooks. Further, the invention may alternatively be formulated as a spray to allow easy application by the user, with the dispensing apparatus being hand pumped or gas driven.

In a further embodiment the composition can be applied to the bait by being formulated such that it is suitable to be injected into bait.

Alternatively the composition can be incorporated into a plastic or gelatine bait.

To attract fish, the composition may be applied to a bait or other suitable support medium, with this bait or other medium being scattered or distributed into an area where fish are known to be found. The bait may alternatively be applied directly to a bare hook, as could the alternative mediums to which the composition was applied where this was suitable.

The composition of the invention may be formulated for a wide range of applications including combining with floatant, spraying flies, combining with greasing or degreasing agents to enable the bait to float or sink as required.

The formulation can also be combined with ground bait and dried for storage purposes.

Formulations of the present invention are surprisingly effective in aqueous solution. Whereas a preferred carrier is ethanol and a basic formulation can include 17,20β-dihydroxy-4-pregnen-3-one or a conjugate in ethanol, in use the formulation produces 17,20β-dihydroxy-4-pregnen-3-one when brought into contact with water.

During the course of fishing, the formulation will be vastly diluted in water and therefore it is a most surprising observation and advantage that use of a formulation according to the present invention can effectively enhance fishing.

An example of a fish sex pheromone which may be advantageously used in a composition according to the invention is 17,20β-dihydroxy-4-pregnen-3-one.

During reproduction, many female fish such as the goldfish, synthesise 17,20β-dihydroxy-4-pregnen-3-one (17,20βP) or a closely related progestational steroid hormone (derived from progesterone and having 21 carbons) in response to the ovulatory surge in gonadotrophin, to induce final oocyte maturation.

17,20βP is also released by the female into the water where it is detected by the olfactory system of the male fish. This subsequently results in an increase in the milt (sperm) levels of the male fish.

17,20βP is therefore considered to be a sex pheromone which stimulates the male's endocrine system prior to spawning. The threshold concentration for the male fish is about $10^{-13}$ M concentration and is the most stimulatory odourant identified in fish (see Sorenson et al. 1987 J. Comp. Physiol, 160A, 305-315).

Although 17,20βP is known to be a reproductive pheromone there has been no suggestion that it may have an alternative role as a feeding attractant in fish.

Another fish sex pheromone which exhibits properties as a fish feeding attracting composition is prostaglandin $F_{2\alpha}$ ($PGF_{2\alpha}$).

This prostaglandin is known to be the post-ovulatory pheromone in a number of cyprinid fish such as the goldfish. Its role is to stimulate male sexual behaviour and the compound is also released by the female during spawning. There is however no evidence that $PGF_{2\alpha}$ has a role other than that as a sex pheromone in fish.

The $PGF_{2\alpha}$ will be added to the feeding attractant at such a concentration that when it enters the water it will dilute to such a concentration that it will be detectable to fish.

A particular composition which includes either a pure or crude synthetic form of 17,20β-dihydroxy-4-pregnen-3-one with an ethanol carrier has been tested by the inventors in laboratory experiments.

Electrophysiological and behavioural studies in an experimental behaviour chamber have indicated that 17,20β-dihydroxy-4-pregnen-3-one is detected by both male and female carp and that detection of this hormone by the fish results in feeding behaviour.

The composition of this particular non-limiting example is the following:

| Component No | Name | Amount required for 1 liter of solvent (ethanol) |
| --- | --- | --- |
| 1 | 17,20β-dihydroxy-4-pregnen-3-one | 3 mg |

Although emphasis has been given to the utility of the present novel composition with respect to its use in fishing, the use of the composition should not be limited thereto. It is understood that the composition may also have utility when used for an array of other purposes. For example, it may be used in the aquaculture industry to enhance food uptake and the ingestion of pharmaceuticals.

The present invention further provides for incorporation into compositions of the present invention, sex pheromones derived from marine polychaetes.

In marine polychaetes, spawning activity and the synchronised release of gametes is effected through the use of sex pheromones. These sex pheromones are known to be located within the coelomic fluid of the polychaetes and are considered to include ketone 5-methyl-3-heptanone, and ketone 3,5-octadiene-2-one and compounds which contain the purine ring system such as uric acid and inosine.

During spawning, some species of polychaetes aggregate in large numbers and release pheromones into the open water in order to synchronise spawning with the opposite sex. Fish can detect these pheromones and use them as a signal that there are large concentrations of prey species present. The sex pheromones release by the polychaetes, therefore serve to act as an attractant to the fish. As such, such pheromones could be used as an active compound in the composition of the present invention, and accordingly used within a bait formulation to attract a range of fish species.

EXPERIMENTAL STUDY

An extensive laboratory based study has been undertaken to demonstrate the role of 17,20β-dihydroxy-4-pregnen-3-one as a feeding attractant in fish. The behaviour of carp in response to 17,20β-dihydroxy-4-pregnen-3-one was studied in a Perspex flow-through experimental flume.

Experiment 1

Fish were placed in the flume individually and allowed to acclimatise for a minimum of 1 hour before each experiment.

The first set of experiments determined the behavioural response of male (n=5) and female (n=5) carp to serial dilutions of pure and synthetic form of 17,20β-dihydroxy-4-pregnen-3-one. Dilutions ranged from one part in $10^5$ to one part in $10^{11}$.

Experiment 2

The second set of experiments tested the behavioural response of male and female carp (n=6) to the same serial dilutions of synthetic 17,20β-dihydroxy-4-pregnen-3-one as used in Experiment 1, but with the addition of 5 dyed-gelatine pellets on the bottom of the flume.

The results of the study demonstrate that the addition of the 17,20β-dihydroxy-4-pregnen-3-one to the behaviour chamber, at concentrations ranging from $10^{-5}$ to one part in $10^{-10}$ resulted in feeding behaviour in carp. This feeding behaviour was characterised by the following:

1. An initial period of gulping and fin extension as the carp detected 17,20β-dihydroxy-4-pregnen-3-one.
2. Subsequent upstream movement and searching behaviour in order to locate the source of the 17,20β-dihydroxy-4-pregnen-3-one.
3. A feeding phase, when the fish subsequently ingested particles of matter on the bottom of the experimental chamber.

The experiment therefore shows that the 17,20β-dihydroxy-4-pregnen-3-one attracted immature carp and also resulted in feeding behaviour in these individuals. As these fish are sexually immature the results suggest that the 17,20β-dihydroxy-4-pregnen-3-one is not operating as a sex pheromone but as a feeding attractant.

The invention claimed is:

1. A method of inducing feeding and feeding behaviour in fish, the method including the step of exposing the fish to a suitable amount of a composition comprising at least one of 17,20β-dihydroxy-4-pregnen-3-one, progesterone, 17,20β,21-trihydroxy-4-pregnen-3-one, testosterone glucuronide, 5β-pregnen-3α,17β-diol-20-one-3α-glucuronide, or 17α-hydroxy-4-pregnen-3-one-20 sulphate, or conjugate thereof, or synthetic version thereof, to induce feeding and feeding behaviour in said fish.

2. The method as claimed in claim 1 wherein the composition comprises 17,20β-dihydroxy-4-pregnen-3-one or conjugate thereof.

3. The method as claimed in claim 1 wherein the composition comprises testosterone glucuronide or 5β-pregnen-3α,17β-diol-20-one-3α-glucuronide, or a synthetic version thereof.

4. The method as claimed in claim 1 wherein the composition further comprises ketone 5-methyl-3-heptanone.

5. The method as claimed in claim 1 wherein the composition comprises 17α-hydroxy-4-pregnen-3-one-20 sulphate.

6. The method as claimed in claim 1 wherein the composition further comprises at least one prostaglandin.

7. The method as claimed in claim 6 wherein the at least one prostaglandin is prostaglandin A, B, D, E or F, or a synthetic version thereof.

8. The method as claimed in claim 6, wherein the composition comprises 17,20β-dihydroxy-4-pregnen-3-one and the prostaglandin is prostaglandin $F_{2\alpha}$.

9. The method as claimed in claim 1 wherein the composition further comprises a carrier.

10. The method as claimed in claim 9 wherein the carrier is an aliphatic alcohol.

11. The method as claimed in claim 9 wherein the carrier is propylene glycol.

12. The method as claimed in claim 1 wherein the composition further comprises at least one potent aroma chemical which is present in the urine of fish.

13. The method as claimed in claim 1 wherein the composition is a liquid.

14. The method as claimed in claim 1 wherein the composition is formulated for injection into a bait for use in fishing.

15. The method as claimed in claim 1 wherein the composition is formulated as a spray.

16. The method as claimed in claim 1 wherein feeding and feeding behaviour are induced in mature and immature fish.

17. The method as claimed in claim 1 wherein the composition comprises 17,20β,21-trihydroxy-4-pregnen-3-one, or a synthetic version thereof.

18. The method as claimed in claim 1 wherein the composition further comprises ketone 3,5-octadiene-2-one.

* * * * *